Jan. 16, 1951    H. J. GRAHAM    2,537,989
PNEUMATIC WELDER

Filed June 1, 1949    2 Sheets-Sheet 1

Inventor
Harold J. Graham
by Roberts, Cushman & Grover
att'ys.

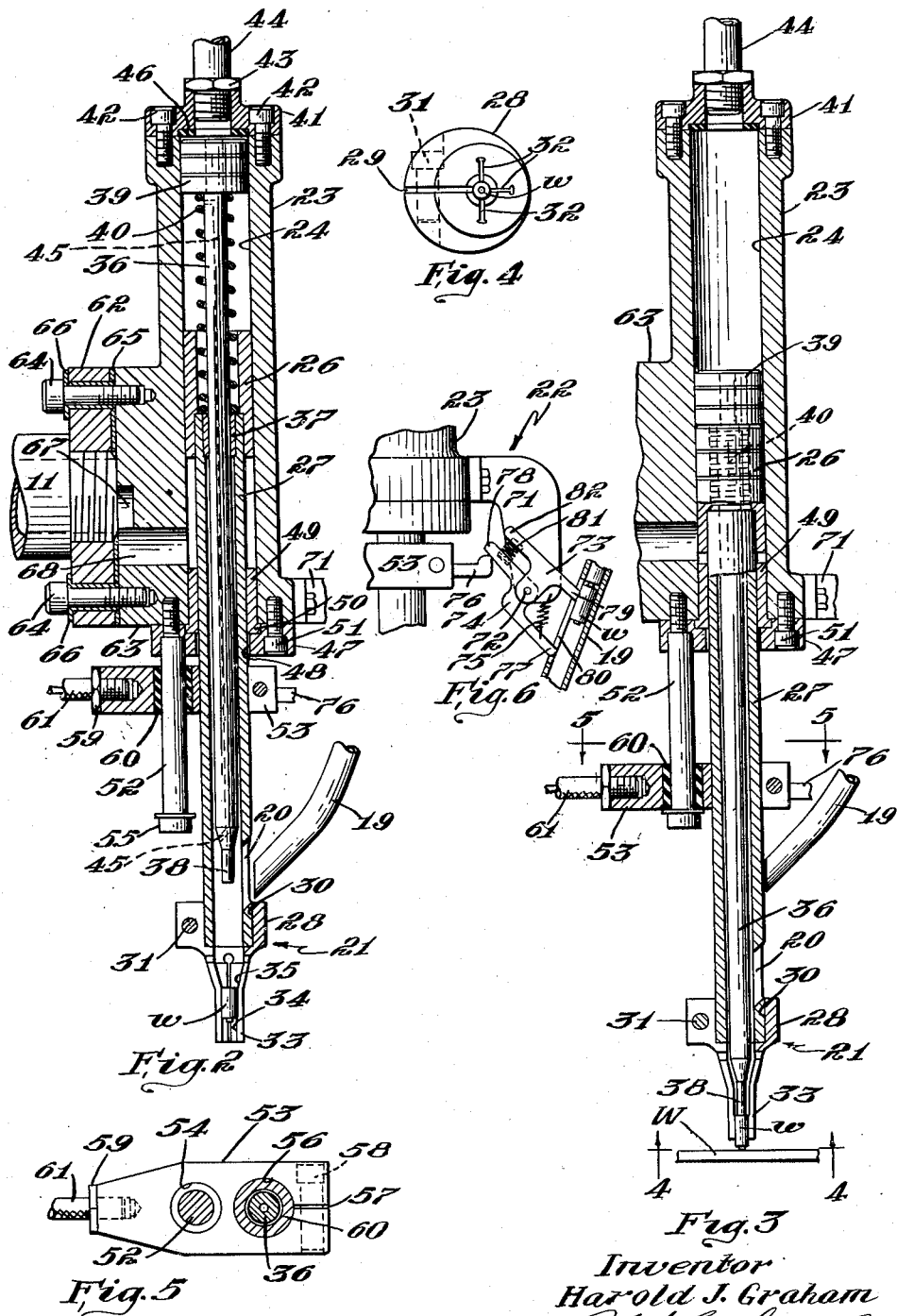

Patented Jan. 16, 1951

2,537,989

UNITED STATES PATENT OFFICE 2,537,989

PNEUMATIC WELDER

Harold J. Graham, Highland Park, Mich., assignor to Graham Manufacturing Corporation, Detroit, Mich., a corporation of Michigan Application June 1, 1949, Serial No. 96,417

7 Claims. (Cl. 219—4)

This invention relates to welding apparatus and more particularly to percussion welding apparatus adapted for welding to a workpiece studs preferably but not exclusively of the type shown in my copending application Serial No. 43,498, now Patent No. 2,518,463 issued August 15, 1950.

Objects of this invention are to provide a welding tool and an associated electro-pneumatic system which will weld a stud to a workpiece, which produce a strong and flaw free union between the stud and the piece, which inherently regulate the welding current, which are rapid in operation, which provide an automatic feed for the studs, which do not require a highly skilled operator, which are simple and safe to use, which are adapted to pass production welding techniques, and which advance the art for welding generally.

In a broad aspect the invention contemplates a welding tool for welding a stud to a workpiece comprising a body with a main piston reciprocatingly disposed in a cylindrical aperture therein. A chuck adapted to hold the stud is carried by the piston and means including an auxiliary piston reciprocatingly disposed in the aperture are provided for inserting the stud in the chuck. Means are also provided for admitting air under pressure to the end of the aperture adjacent the auxiliary piston to move said auxiliary piston against the force of a spring interposed between the pistons, thereby to insert a stud in the chuck. The main piston is moved by the air until the stud subsequently contacts the workpiece. The contacting of the stud with the workpiece maintains a welding circuit supplying energy to the point of contact of the stud and workpiece. The stud is maintained in forcible contact with the workpiece until the welding is completed, whereupon restoring means return the pistons and concomitantly disconnect the power source after the completion of the weld. In a specific aspect the invention contemplates a welding gun comprising a body having a boss on the side thereof which is fastened to a hollow arm for supporting the gun. The main piston is reciprocatingly disposed in an aperture in the body and biased in a normal position by means of restoring air introduced into said aperture adjacent one side of the main piston through the hollow supporting arm and a connecting aperture in the boss. A main piston rod having an aperture extending throughout the length thereof is fastened at one end to the piston, the other end of the rod being fastened to one end of a collet of a chuck. The other end of the collet has a plurality of jaws adapted to hold a stud, the inner surfaces of the jaws defining the walls of an aperture axially aligned with the aperture of said rod so that the stud can be inserted through a slot in the rod adjacent the collet either manually or automatically. The rod also carries a connecting member adjustably fastened thereto which is adapted to connect to one terminal of a welding power source whose other terminal is connected to the workpiece. A stop secured to the body cooperates with the connecting member to limit the travel of the chuck. An auxiliary piston rod is carried by an auxiliary piston arranged within the main piston rod to insert the stud in the jaws of the collet. A spring is interposed between the main and auxiliary pistons. Means are provided for admitting air under pressure to the opposite end of the body aperture adjacent the auxiliary piston to move the auxiliary piston against the force of the spring so that it contacts the main piston thereby inserting a stud in the chuck. The main piston is subsequently moved thereby until the stud carried by the collet jaws contacts the workpiece to maintain a welding circuit including the welding power source for supplying energy to the point of contact. Upon the removal of the operating air upon the completion of the weld, the restoring air returns to the main system to its normal position and concomitantly disconnects the welding circuit.

These and other objects and aspects will be apparent from the following description of an illustrative specific embodiment of the invention referring to drawings in which:

Fig. 2 is a cross-sectional view of the welding gun showing the main and auxiliary pistons in their normal positions;

Fig. 3 is a similar cross-sectional view showing the pistons at the end of their respective strokes;

Fig. 4 is a view on line 4—4 of Fig. 3;

Fig. 5 is a cross-sectional view on line 5—5 of Fig. 3;

Fig. 6 is a fragmentary view of the escapement for regulating the rate the studs are supplied to the gun chuck.

Figure 1:
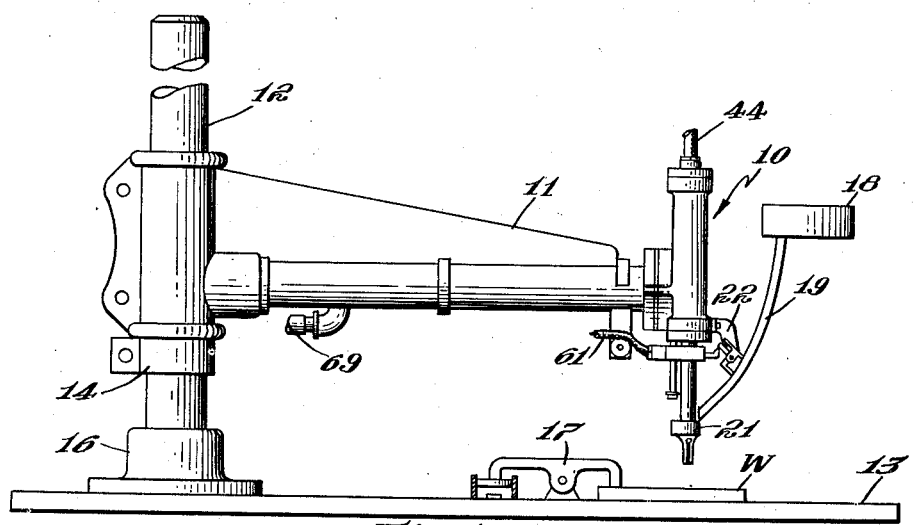
Fig. 1 is a side elevation view of the welding gun and its supporting arm.

In the particular embodiment of the invention chosen for the purpose of illustration, a welding tool or gun 10 (Fig. 1) is fastened at one end of a cantilever arm 11. The opposite end of the arm 11 is rotatably supported by a vertical member or column 12. The elevation of the arm 11 with respect to a work table 13 is maintained by a split clamp band 14, the location of which is adjustable so that the position of the gun 10 can be varied to accommodate workpieces having different heights. The lower end of the column 12 terminates in a flange 16 which is bolted or otherwise secured to the top surface of the work table 13.

The workpiece W to which a stud w is welded by the gun 10 is supported upon the table 13 beneath the gun being held in intimate contact with the table by means of a pneumatically operated clamp 17 thereby insuring low electrical contact resistance therebetween. The welding studs w, preferably similar to those shown in my copending application Serial No. 43,498, are fed either by hand or automatically from a hopper 18 through a conduit such as the tube 19 into a chuck 21. The studs w are moved through the tube 19 by the force of gravity, the rate of their fall being regulated by the escapement mechanism 22 so that only one stud is delivered to the chuck 21 during each complete operating cycle of the gun 10, as will be described in detail hereinafter.

As is shown in Fig. 2, the gun 10 comprises a body 23 which is generally cylindrical in shape and has a cylindrical aperture 24 coaxially arranged therein wherein a main piston 26 is reciprocatingly disposed. The piston 26 is hollow, the aperture therein being enlarged at the lower end thereof to accommodate a hollow piston rod 27, the end of which rod is pressed or otherwise secured in the enlarged portion of the piston aperture.

The opposite end of the rod 27 engages the chuck 21, the rod end projecting into an aperture 30 in the upper portion of a collet 28. The wall of the aperture 30 is split, being provided with a slot as at 29 (Fig. 4) so that the tightening of a screw 31 reduces the diameter of the aperture, thereby to clamp the end of the rod 27 therein. The lower end of the collet 28 is divided by three additional axial slots 32 to form the jaws 33 having inner surfaces defining an aperture 34 which is in axial alignment with the aperture in the rod 27, being connected therewith by means of a passage having a conical wall 35. The diameter of the aperture 34 is preferably slightly less than the diameter of the stud w to be welded so that the stud does not fall through the aperture but is restrained until forced into the aperture, as described below.

An auxiliary piston rod 36 is disposed within the cylindrical aperture extending throughout the length of the main piston rod 27, being maintained in coaxial relationship therewith by means of a bushing 37. The lower end of the auxiliary rod 36 is reduced in diameter to form a finger 38 which forces the stud w into the jaws 33 of the chuck 21, as will be described hereinafter. The upper end of the auxiliary rod 36 is carried by an auxiliary piston 39 which is reciprocatingly disposed in the body aperture 24 between the main piston 26 and a cylinder head 41, the pistons normally being maintained in spaced relationship by means of a spring 40.

The head 41 is fastened to the body 23 by means of the bolts 42. Centrically located in the head 41 is a threaded aperture for engaging the threads of a compression fitting 43 connecting to a conduit 44 leading to a conventional supply of compressed air (not shown). A soft rubber washer 46 is interposed between a recess in the head 41 and the end of the body 23 to act as a shock absorber for the auxiliary piston 39. The opposite end of the body 23 is closed by a head 47 having an aperture 48 therein through which projects the main piston rod 27, the diameters of the rod and head being such that a small clearance is provided therebetween. The rod 27 is centrally positioned with respect to the aperture 48 by means of a bushing 49 having an aperture which is slidably engaged by the rod. The bushing 49 has a flange 50 which is pinched between the end of the body 23 and the bottom of a recess in the head 47.

Figure 7:
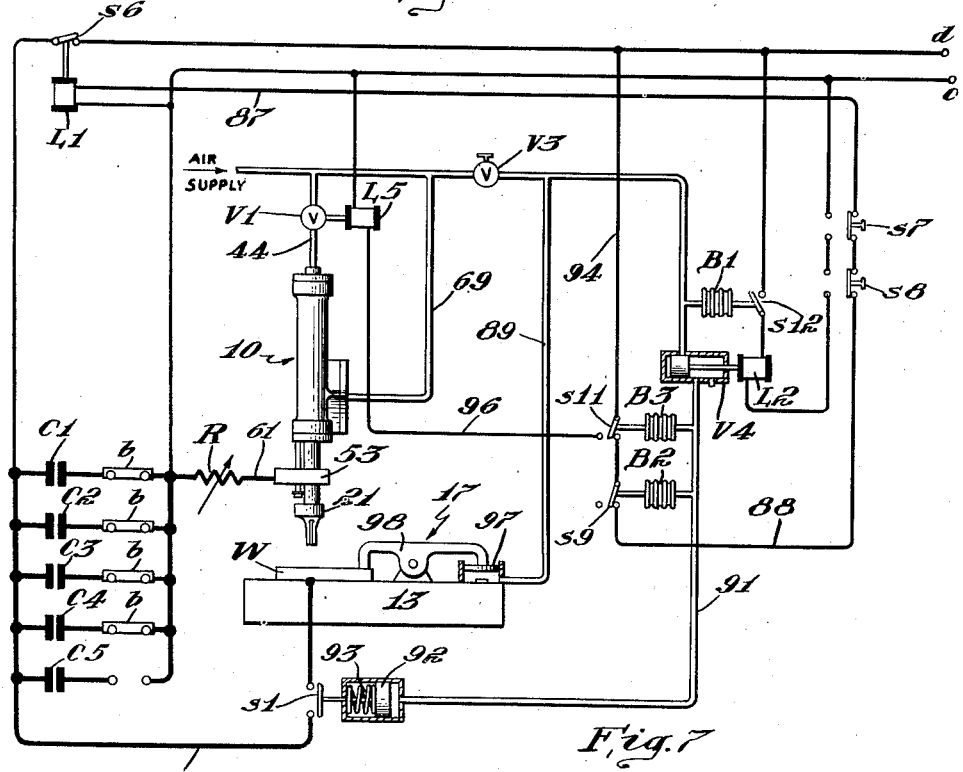
Fig. 7 is a schematic diagram of the electro-pneumatic system associated with the gun.

The head 47 is secured to the lower end of the body 23 by means of the bolts 51 and 52. The body portion of the bolt 52 is extended so that the head 55 thereof acts as a stop for a connecting piece such as the arm 53. The arm 53 has two parallel circular apertures 54 and 56 therethrough, as is shown in Fig. 5. The wall of the aperture 56 is split at one end of the arm 53 as at 57 so that the arm can be clamped in any selected position with respect to the main piston rod 27 by the tightening of a screw 58. The opposite end of the arm 53 is provided with a recess for an electrical connector 59 for connecting the arm to a cable 61 leading to a terminal of a conventional welding power source such as the capacitors C1 through C5 (Fig. 7). The aperture 54 is provided with an insert, such as the bushing 60 of nonconducting material, for insulating the arm 53 from the body portion of the bolt 52 so that leakage currents do not circulate through the body 23 thereby to pit the pistons 26 and 39.

The gun 10 is supported by the arm 11, as mentioned heretofore, the end of the arm 11 being threaded to engage the internal threads in an aperture in a flange 62. The flange 62 is fastened to a boss 63 cast integrally with the gun body 23 by means of the bolts 64. The boss 63 and the flange 62 are electrically insulated from one another by means of a nonconducting gasket 65 which is interposed therebetween. The bolts 64 are isolated from the flange 62 by bushings 66 of nonconducting material. Restoring air is introduced into the aperture 24 beneath the main piston 26 by means of the passageways 67 and 68 in the boss 63 which connect with the interior of the hollow arm 11. The restoring air enters the arm 11 through a conduit 69 (Fig. 1) which is connected to the compressed air supply (not shown).

The escapement 22 (Fig. 6), for controlling the rate at which the studs w are fed to the chuck 21, comprises an arm 71 having one end secured to the lower end of the body 23, the other end thereof being provided with a pivot 72 for the two pallets 73 and 74. One end of the pallet 74 terminates in a finger 77 which projects through a slot 80 in the wall of the tube 19, its other end 78 being in the path of an actuator 76 carried by the connecting arm 53. A spring 75 is connected between the finger end 77 and the arm 71 for biasing the pallet 74 so that the travel of the arm 76 is opposed by the end 78 thereof. One end of the pallet 73 terminates in a similar finger 79 projecting through the slot 80 in the wall of the tube 19. The ends 78 and 82 of the pallets 74 and 73, respectively, are maintained in spaced relationship by a spring 81 which is interposed therebetween.

When the chuck 21 is in the normal retracted position shown in Fig. 2, the actuator 76 maintains the pallet 74 against the force exerted by the spring 75 in such a position as to retract the finger 77 from the slot 80 so that it does not obstruct the passageway in the tube 19. The spring 81 concomitantly urges the pallet 73 so that its finger 79 is maintained in yieldable contact with the stud w thereby restraining the studs stacked above stud w from descending down the tube 19. Upon the operation of the gun 10, as will be described in detail hereinafter, the actuator 76 descends, releasing the end 78 of the pallet 74, whereupon the spring 75 moves the finger 77 into the tube 19 thereby to block the passageway therethrough. This movement of the pallet 74 removes the force exerted upon the lowest stud w by the actuator 76 also so that the stud W drops until its fall is obstructed by the finger 77, the remaining studs descending until a second stud moves into the position previously occupied by the stud $w$ which is being restrained at this point by the finger 77. As the actuator 76 contacts the end 78 of the pallet 74 upon the return stroke at the end of the welding cycle, the spring 81 is compressed so that the finger 79 exerts a restraining force upon the stud then adjacent thereto. The finger 77 substantially simultaneously releases the stud $w$ held thereby so that such stud slides down the tube 19 through a slot 20 in the wall of the rod 27, which slot is adjacent the end of the tube 19 when the rod is in its retracted position.

In Fig. 7 are shown typical electrical and pneumatic connections to the welding gun 10. Electric energy for the welding process is supplied from a power source, preferably a bank of capacitors C1 through C5. One terminal of each of the respective capacitors C1 through C5 is connected to the work-supporting table 13 by means of a heavy conducting cable 86 and the normally open contacts of an electrical interlock such as the pneumatically operated switch $s1$. The other respective terminals of capacitors C1 through C5 are connected to the arm 53 by means of the cable 61, a variable resistor R, and the correlated conducting straps $b$. By varying the number of straps $b$ linking the capacitors C1 through C5 to the gun 10 and the setting of the resistor R, it is thereby possible to connect the required number of capacitors required to supply a capacitor discharge current suitable for the size and type of material of the stud $w$ and the workpiece W.

The capacitors C1—C5 are charged from the terminals $d$ and $c$ of a conventional direct power supply (not shown) upon the closing of the normally open contact $s6$ by the energization of a solenoid L1. During the time intervals between successive operating cycles, the solenoid L1 is energized from the terminals $d$ and $c$ by a circuit including a conductor 87, the normally closed contacts of two switches $s7$ and $s8$, the conductors 88 and 94, and the normally closed contacts of the switches $s9$ and $s11$ of two pneumatically operated relays whose function will be described in detail hereinafter. The normally open contacts of the switches $s7$ and $s8$ are series connected safety interlocks positioned so that it is necessary for the operator to use the palms of both hands simultaneously to close both switches thereby insuring that neither hand is in contact with the welding gun 10 during the welding cycle.

Restoring air for the welding gun 10 is supplied through the conduit 69 from the conventional compressed air supply, as described heretofore. The operating air for the welding gun 10 is supplied through the conduit 44 and an electrically operated supply valve such as the solenoid operated valve V1 preferably from the same air supply, although it will be understood that separate air supplies may be used for the restoring and operating air respectively.

Upon the opening of the valve V1 by the energization of a solenoid L5, as will be described below, operating air is admitted through the head 41 into the upper portion of the body aperture 24 thereby moving the auxiliary piston 39 against the force of the spring 40 so that the finger 38 at the end of the rod 36 forces the stud $w$, which has been delivered through the slot 20 in the tube 19 into the jaws 33, as described above. The auxiliary piston 39 then compresses the spring 40 until it contacts the top of the main piston 26, the air trapped between the piston being bled out through a passage 45 in the auxiliary piston rod 36. Both pistons thereupon descend conjointly until the arm 53 contacts the head 55 of the bolt 52, the position of the arm 53 having been previously adjusted with respect to the rod 27 so that the downward motion of the chuck 21 is stopped immediately after the stud $w$ contacts the workpiece W.

Upon the closing of the valve V1, after the completion of the weld, the restoring air is supplied through the conduit 69 and supporting arm 11 to the portion of the aperture 24 beneath the main piston 26 and returns the main piston to its normal retracted position. The auxiliary piston 39 is returned to its normal retracted position, as shown in Fig. 2, by the force exerted by the spring 40.

The compressed air for operating the clamp 17 is supplied through the conduit 89 and a manually operated valve V3 which preferably is opened by the use of the operator's foot. Air controlled by the valve V3 also is admitted to extend a bellows B1 of a pneumatically operated relay with a contact $s12$ which is closed by the bellows only after the air pressure has increased sufficiently to operate the clamp 17 in a satisfactory manner so that the workpiece W is secured to the table and a good electrical contact established therebetween before the contact $s12$ closes. The contact $s12$ thereby acts as an interlock insuring satisfactory electrical contact between the table 13 and the workpiece W before the contact closes to maintain the energization of a solenoid L2 from the power source terminals $d$ and $c$ by means of a circuit also including the normally open contacts of the palm operated safety switches $s7$ and $s8$.

Energization of the solenoid L2 as above operates a control valve V4 whereby air supplied through the foot operated valve V3 is introduced into the conduit 91 and thereby into the bellows B2 and B3 and a cylinder enclosing a piston 92 for operating the switch $s1$. As the air pressure increase in the conduit 91 upon the opening of the valve V4, the following successive steps take place: (1) the normally closed contacts of the switch $s9$ are opened by the extension of the bellows B2, thus preventing the energizing of the solenoid L1 during the welding cycle; (2) the switch $s1$ in the welding circuit is closed against the biasing force of a spring 93 by the piston 92; (3) the bellows B3 is extended to close the normally open contact of the switch $s11$, thereby energizing the solenoid L5 operating the valve V1 from the power source terminals $d$ and $c$ through a circuit also including the conductors 94 and 96. The resulting opening of the valve V1 supplies operating air to the gun 10 whereby the stud $w$ is moved into contact with the workpiece W, as described heretofore, thereby discharging the capacitors C1—C5 through the point of contact, the stud being maintained in forcible contact with the workpiece until welding is completed.

When setting up the gun 10, the resistor R is varied and the number of capacitors C connected in the welding circuit of the gun 10 by the straps $b$ is determined experimentally so that a complete fusion of the weld is obtained without excessive burning of the stud.

After the set up is complete, the operation during production welding is simple. The operator first places the workpiece W upon the table 13, or if the piece is irregular in shape upon a metal fixture fastened to the top of the table. The operator next steps upon the foot operated valve V3 and simultaneously places his hands upon the safety switches s7 and s8. The resulting opening of the valve V3, as described above, admits air through the conduit 89 to move a piston 97 of the clamp 17 upwardly so that the finger at the opposite end of a lever 98 forces the workpiece W against the table 13, thus insuring a low resistance electrical contact therebetween. The operation of the safety switches s7 and s8 opens the normally closed contacts thereof to interrupt the circuit energizing the solenoid L1, thereby opening the contact s6 so that the power source terminals d and c are not short-circuited through the low resistance of the welding circuit during the welding cycle. The opening of the valve V3 also extends the bellows B1 so that the contact s12 energizes the solenoid L2, thus operating the control valve V4.

Air admitted through the valve V4 increases the pressure in the conduit 91 until the bellows B2 extends to open the contact of the switch s9, thus insuring that the accidental closing of the normally closed contacts of the safety switches s7 and s8 will not energize the solenoid L1 during the welding cycle if the operator should remove his hands from the respective switches. A further increase in air pressure exerts sufficient pneumatic force upon the piston 92 to overcome the force exerted by the restoring spring 93, thereby closing the switch s1. The bellows B3 then extends to close the normally open contact of the switch s11 to energize the solenoid L5 operating the valve V1 so that the gun 10 moves the stud w into contact with the workpiece W, as described heretofore.

After the discharge of the capacitors C1—C5 has completed the weld, the operator removes his foot to close the valve V3, thereby reducing the pressure in the conduit 91 so that the bellows B1 collapse opening the contact s12, thus moving the valve V4 to vent the conduit 91 to atmosphere. The bellows B3 collapses upon the reduction of pressure in the conduit 91, thereby opening the normally open contact of the switch s11 to de-energize the solenoid L5 of the valve V1. Upon the reduction of the air pressure above the auxiliary piston 39 of the gun 10, the restoring air returns the chuck 21 to its retracted position, the stud w being released because of the flexibility of the jaws 33. The contact of the switch s9 closes only after the pressure in the conduit 91 is below that pressure at which the switch s1 is opened by the spring 93 so that the welding circuit is opened to prevent the short-circuiting of the power source terminals d and c in the event the gun 10 fails to retract.

It should be understood that the present disclosure is for the purpose of illustration only and that this invention includes all modifications and equivalents which fall within the scope of the appended claims.

I claim:

1. A welding gun for welding a stud to a workpiece comprising means for connecting said gun to one terminal of a welding power source the other terminal of which is connected to said workpiece, a body having a cylindrical aperture therein, a main piston reciprocatingly disposed in said aperture, a chuck adapted to hold said stud carried by said piston, means including an auxiliary piston reciprocatingly disposed in said aperture for inserting said stud in said chuck, a spring interposed between said pistons, means for admitting air under pressure to the end of the aperture adjacent said auxiliary piston to move said auxiliary piston against the force of the spring so that it contacts said main piston thereby inserting a stud in said chuck and subsequently moving said main piston until said stud contacts said workpiece to maintain a welding circuit including said power source for supplying energy to the point of contact, said stud being maintained in forcible contact with said workpiece until the welding is completed, and restoring means for returning said pistons after the completion of the weld.

2. A welding gun for welding a stud to a workpiece comprising means for connecting said gun to one terminal of a welding power source the other terminal of which is connected to said workpiece, a body having a cylindrical aperture therein, a main piston reciprocatingly disposed in said aperture, a chuck adapted to hold said stud, a hollow main piston rod having said piston and said chuck fastened at the respective ends thereof, an auxiliary piston reciprocatingly disposed in said aperture, means including an auxiliary piston rod carried by said auxiliary piston and arranged within said main rod whereby said stud is inserted in said chuck, a spring interposed between said pistons, means for admitting air under pressure to the end of the aperture adjacent said auxiliary piston to move said auxiliary piston against the force of the spring so that it contacts said main piston thereby inserting a stud in said chuck and subsequently moving said main piston until said stud contacts said workpiece to maintain a welding circuit including said power source for supplying energy to the point of contact, said stud being maintained in forcible contact with said workpiece until the welding is completed, and restoring means for returning said pistons after the completion of the weld.

3. A welding gun for welding a stud to a workpiece comprising means for connecting said gun to one terminal of a welding power source the other terminal of which is connected to said workpiece, a body having a cylindrical aperture therein, a main piston reciprocatingly disposed in said aperture, a chuck adapted to hold said stud carried by said piston, means including an auxiliary piston reciprocatingly disposed in said aperture for inserting said stud in said chuck, a spring interposed between said pistons, means for continuously introducing restoring air under pressure to the end of the aperture adjacent said main piston, and means for admitting operating air under pressure to the opposite end of the aperture adjacent said auxiliary piston to move said auxiliary piston against the force of the spring so that it contacts said main piston thereby inserting a stud in said chuck and subsequently moving said main piston until said stud contacts said workpiece to maintain a welding circuit including said power source for supplying energy to the point of contact, said stud being maintained in forcible contact with said workpiece until the welding is completed, said restoring air returning said main piston upon the removal of the operating air after the completion of the weld.

4. A welding gun for welding a stud to a workpiece comprising means for connecting said gun to one terminal of a welding power source the other terminal of which is connected to said workpiece, a body having a cylindrical aperture therein and a boss on the side thereof with a passageway connecting with one end of said aperture, a hollow arm fastened to said boss to support said gun and having a passageway connecting with the passageway in said boss, a main piston reciprocatingly disposed in said aperture, means including the passageways for introducing restoring air to the end of said aperture adjacent the main piston, a chuck adapted to hold said stud carried by said piston, means including an auxiliary piston reciprocatingly disposed in said aperture for inserting said stud in said chuck, a spring interposed between said pistons, and means for admitting operating air under pressure to the opposite end of the aperture adjacent said auxiliary piston to move said auxiliary piston against the force of the spring so that it contacts said main piston thereby inserting a stud in said chuck and subsequently moving said main piston until said stud contacts said workpiece to maintain a welding circuit including said power source for supplying energy to the point of contact, said stud being maintained in forceable contact with said workpiece until the welding is completed, said restoring air returning said main piston upon the removal of the operating air after the completion of the weld.

5. A welding gun for welding a stud to a workpiece comprising means for connecting said gun to one terminal of a welding power source the other terminal of which is connected to said workpiece, a body having a cylindrical aperture therein, a main piston reciprocatingly disposed in said aperture, a main piston rod having an aperture extending throughout the length thereof and fastened to one end of said piston, a chuck including a collet having one end fastened to said rod, the other end of said collet having a plurality of jaws adapted to hold said stud, the inner surfaces of said jaws defining the walls of an aperture axially with the aperture of said rod, said rod having a slot adjacent said collet wherein the stud is inserted, an auxiliary piston reciprocatingly disposed in said body aperture, an auxiliary piston rod carried by said auxiliary piston and arranged within said main piston rod for forcing the stud into the jaws of said collet, a spring interposed between said pistons, means for admitting air under pressure to the end of the aperture adjacent said auxiliary piston to move said auxiliary piston against the force of the spring so that said auxiliary rod inserts a stud in said chuck, said auxiliary piston compressing said spring until it contacts said main piston thereby moving said main piston until said stud contacts said workpiece to maintain a welding circuit including said power source for supplying energy to the point of contact, said stud being maintained in forcible contact with said workpiece until the welding is completed, and restoring means for returning said pistons after the completion of the weld.

6. A welding gun for welding a stud to a workpiece comprising a body having a cylindrical aperture therein, a main piston reciprocatingly disposed in said aperture, a chuck adapted to hold said stud, a hollow main piston rod having said piston and said chuck fastened at the respective ends thereof, an auxiliary piston reciprocatingly disposed in said aperture, a connecting member adjustably fastened to said rod and adapted to be connected to one terminal of a welding power source the other terminal of which is connected to said workpiece, a stop secured to said body and cooperating with said connecting member to limit the travel of said chuck, means including an auxiliary piston rod carried by said auxiliary piston and arranged within said main piston rod to insert said stud in said chuck, a spring interposed between said pistons, and means for admitting air under pressure to the end of the aperture adjacent said auxiliary piston to move said auxiliary piston against the force of the spring so that it contacts said main piston thereby inserting a stud in said chuck and subsequently moving said main piston until said stud contacts said workpiece to maintain a welding circuit including said power source for supplying energy to the point of contact, said stud being maintained in forcible contact with said workpiece until the welding is completed, and restoring means for returning said piston after the completion of the weld.

7. A welding gun for welding a stud to a workpiece comprising a body having a cylindrical aperture therein and a boss on the side thereof with a passageway connecting with one end of said aperture, a hollow arm fastened to said boss to support said gun and having a passageway connecting with the passageway in said boss, a main piston reciprocatingly disposed in said aperture, means including the passageways for continuously introducing restoring air to the end of said aperture adjacent the main piston, a main piston rod having an aperture extending throughout the length thereof and fastened at one end to said piston, a chuck including a collet having one end fastened to said rod, the other end of said collet having a plurality of jaws adapted to hold said stud, the inner surfaces of said jaws defining the walls of an aperture axially aligned with the aperture of said rod, said rod having a slot adjacent said collet wherein the stud is inserted, a connecting member adjustably fastened to said rod and adapted to be connected to one terminal of a welding power source the other terminal of which is connected to said workpiece, a stop secured to said body and cooperating with said connecting member to limit the travel of said chuck, an auxiliary piston reciprocatingly disposed within said body aperture, an auxiliary piston rod carried by said auxiliary piston and arranged within said main piston rod to insert said stud in the jaws of said collet, a spring interposed between said piston, and means for admitting operating air under pressure to the opposite end of the aperture adjacent said auxiliary piston to move said auxiliary piston against the force of the spring so that it contacts said main piston thereby inserting a stud in said chuck and subsequently moving said main piston until said stud contacts said workpiece to maintain a welding circuit including said power source for supplying energy to the point of contact, said stud being maintained in forcible contact with said workpiece until the welding is completed, said restoring air returning said main piston upon the removal of the operating air after the completion of the weld.

HAROLD J. GRAHAM.

REFERENCES CITED

The following references are of record in the file of this patent:

UNITED STATES PATENTS

| Number | Name | Date |
|---|---|---|
| 2,078,694 | Smith | Apr. 27, 1937 |